Dec. 3, 1957 C. E. TACK 2,815,102
BRAKE HEAD BALANCING DEVICE
Original Filed Aug. 14, 1951
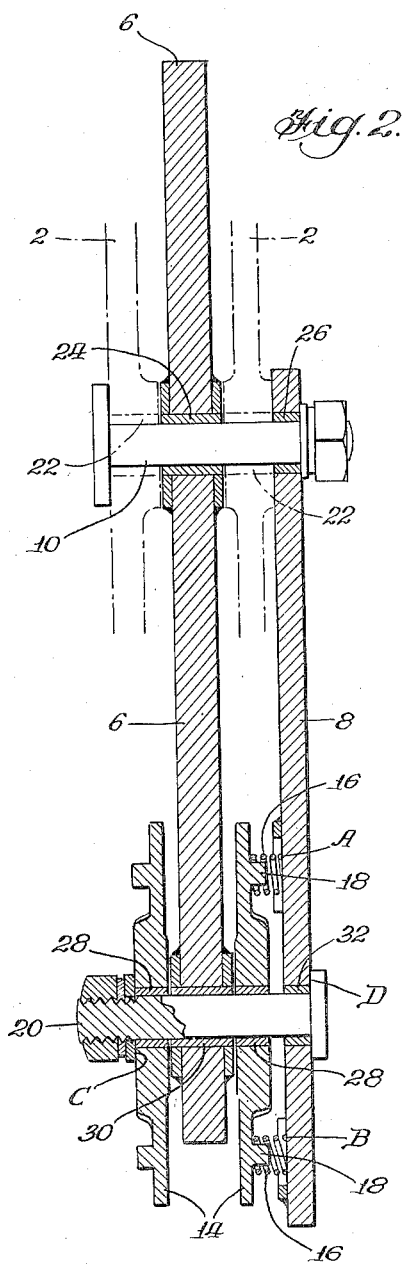
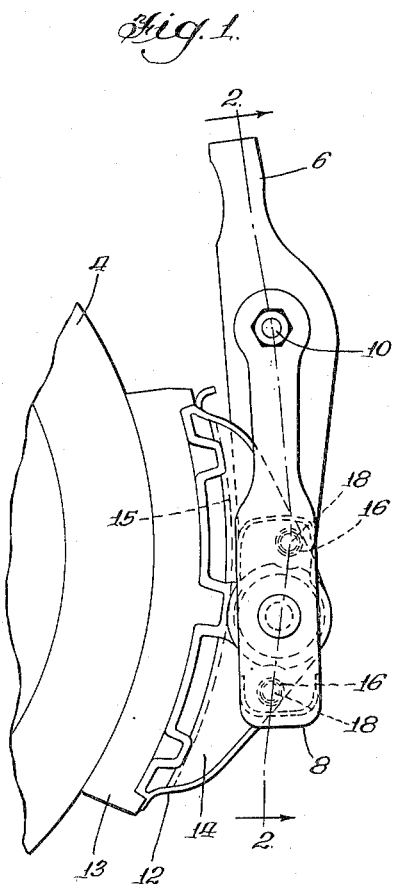
INVENTOR.
Carl E. Tack
BY Walter J. Schlegel, Jr.
Atty.
Witness:
Paul H. Gallagher

United States Patent Office 2,815,102
Patented Dec. 3, 1957

2,815,102
BRAKE HEAD BALANCING DEVICE

Carl E. Tack, Chicago, Ill., assignor to American Steel Foundries, Chicago, Ill., a corporation of New Jersey Original application August 14, 1951, Serial No. 241,829, now Patent No. 2,768,713, dated October 30, 1956. Divided and this application May 15, 1956, Serial No. 584,967

10 Claims.  (Cl. 188—205)

This application is a division of my co-pending application Serial No. 241,829, filed August 14, 1951, now Patent 2,768,713.

My invention pertains to the beamless type of brake rigging for railway cars and is particularly concerned with a novel mechanism for applying a braking force to the car wheel and automatically maintaining a brake head in desired positions relative to the wheel; such mechanism is commonly known as a brake head balancing device.

An object of my invention contemplates the provision of novel and efficient friction means capable of automatically maintaining the brake head in an upright, spaced relation relative to the wheel while the brake is disengaged to prevent the shoe from dragging or binding on the wheel.

Another object of my invention contemplates the provision of an automatically rotatable brake head about its pivotal support so that the shoe will complementally engage the wheel tread upon actuation, within the practical limits of the varying relations between the shoe and wheel, as the wearing away of metal at the braking surfaces and the continually changing distance between the axis of the sprung brake head and the axis of the unsprung wheel.

A further object of my invention contemplates the provision of a hanger lever and a balance hanger pivotally secured on a common axis so that the friction developing surfaces are not constantly worked during application and release of the brake, but are only worked to accommodate head adjustments.

A yet further object of my invention contemplates the provision of frictional moments, automatically developed, to oppose the rotation of the brake head about its pivotal support.

A still further object of my invention contemplates a design such that spring forces are not imposed on the hanger lever which would shift it as wear takes place between friction parts.

A different object of my invention contemplates the provision of novel means capable of automatically producing a nonbinding disengagement of the brake shoe and wheel tread when the braking force is released.

My invention embodies other novel features, details of construction and arrangement of parts, which are hereafter set forth in the specification and claims and illustrated in the accompanying drawings, wherein:

Figure 1 is a side elevational view of my invention.

Figure 2 is an enlarged sectional view on the line 2—2 of Figure 1.

Describing my invention in detail and with reference to the drawings illustrating the mechanism in the engaged position, numeral 2 indicates a hanger lever bracket secured to a railway car truck (not shown) in which an axle (not shown) carrying a wheel 4 is journaled. Hanger lever 6 and balance hanger 8 may be pivotally supported by a pin or bolt and nut assembly 10 secured to bracket 2; brake head 12 is provided with an opening defined by spaced walls 14, 14 and front wall 15 for the reception of hanger lever 6 and for the positive limitation of rotation of brake head 12 relative to hanger lever 6. Brake shoe 13 is secured to brake head 12 for movement therewith. Helical springs 16, 16, sleeved around lugs 18, 18, are interposed between wall 14 and balance hanger 8, the springs being seated in flat face abutment. Hanger lever 6, balance hanger 8, brake head 12, and springs 16, 16, are secured in assembled relation by a bolt and nut assembly 20. This arrangement affords spaced supporting bearings for the bolt of bolt and nut assembly 20, retains springs 16, 16 in a compressed or loaded condition, and affords pivotal movement of brake head 12 relative to its axis against the frictional resistance developed at A, B, C and D, as hereinafter more fully described. Bushings affording better wearing surfaces are provided in every pivotal connection as at 22, 22, 24, 26, 28, 28, 30 and 32.

My novel brake head balancing device functions as follows:

The forces exerted by compressed springs 16, 16 cause the members to firmly frictionally engage each other at A, B, C and D to maintain brake head 12 in a substantially upright position while the brake is disengaged; as result of any turning moment exerted on the brake head the flat ends of springs 16, 16 will tend to slide on balance hanger 8 at A and B, the brake head will tend to slide on the washer at C, and the bolt head will tend to slide on the balance hanger at D. This sliding is resisted or checked by the frictional moments automatically developed at A, B, C and D. Consequently, the brake head will normally not rotate under the influence of its weight, vibrations and impacts but will remain in an upright position to readily facilitate braking. The forces exerted by compressed springs 16, 16 on the brake balancing device act to prevent rattling and damaging vibrations.

It is to be noted that during application and release of the brake, the hanger lever 6 and balance hanger 8 rotate in unison on a common axis about the bolt and nut assembly 10, so that relative rotational movement between the lever and hanger is prevented, thereby avoiding consequent working of the springs 16, 16 and excessive wear of the friction parts along surfaces A, B, C, and D.

Furthermore, forces of the springs 16, 16 in the novel arrangement are not imposed on the hanger lever 6 inasmuch as such spring forces therein would shift the lever 6 as wear takes place at A, B, C and D.

I claim:

1. A brake head balancing device for a railway car truck comprising a supporting pin connected to said truck, a hanger lever pivotally connected to said pin, brake head and a balance hanger pin-connected to said lever, balance hanger being pivotally connected to said pin, means fixing said balance hanger relative to the axis of said pin, and resilient means interposed between said brake head and balance hanger.

2. In a brake head balancing device for a railway car truck; the combination of a hanger lever, a balance hanger, a pin supported by said truck and extending through aligned openings of said lever and hanger, said openings being dimensioned for receiving said pin so as to fix the axis thereof relative to the balance hanger, a brake head having spaced walls receiving said lever therebetween, a pin extending through aligned openings of said walls, said lever, and said hanger, abutments on said pin bearing against the remote sides of the hanger and one of said walls and resilient means compressed between the hanger and the other of said walls.

3. A brake head balancing device for a railway car truck comprising a supporting pin connected to said truck, a hanger lever pivotally connected to said pin, a balance hanger having an opening receiving said pin and being so dimensioned as to fix the axis of the pin relative to the balance hanger, a brake head pivotally supported by said hanger lever and balance hanger, said brake head having spaced walls, said hanger lever being disposed between said walls, one of said walls being disposed between said hanger lever and balance hanger, and a compressed spring seated against said one wall and balance hanger.

4. A brake head balancing device for a railway car truck comprising a supporting pin connected to said truck, a hanger lever pivotally connected to said pin, a balance hanger pivotally connected to said pin about an axis fixed relative to the balance hanger, a brake head pivotally connected to said lever and hanger, and a compression spring interposed between said brake head and balance hanger.

5. A brake head balancing device for a railway car truck comprising a supporting pin connected to said truck, a hanger lever pivotally connected to said pin, a balance hanger pivotally connected to said hanger lever about an axis fixed relative to the balance hanger, a brake head pivotally pin-supported by said hanger lever and balance hanger, and compressed resilient means seated against said brake head and balance hanger.

6. A brake head balancing device for a railway car truck comprising a supporting pin connected to said truck, a hanger lever pivotally connected to said pin, a balance hanger pin connected to said hanger lever, a balance hanger pivoted on the first said pin about an axis fixed relative to the balance hanger, a brake head pivotally pin-supported by said hanger lever and balance hanger, and frictional means for maintaining said brake head in operative positions.

7. A brake head balancing device for a railway car truck comprising a supporting pin connected to said truck, a hanger lever pivotally connected to said pin, a balance hanger pin-connected to said hanger lever and pivotally connected to said pin about an axis fixed relative to the balance hanger, a brake head provided with spaced walls having lugs extending outwardly therefrom, a bolt and nut assembly for pivotally securing said head to said hanger lever and balance hanger, said hanger lever being disposed between said walls, one of said walls being disposed between said hanger lever and balance hanger, compressed helical springs interposed between said one wall and balance hanger and sleeved around said lugs and seated in flat face abutment with said one wall and balance hanger, said bolt and nut assembly having plain annular friction surfaces in abutment with the other wall and balance hanger.

8. A brake head balancing device for a railway car truck comprising a supporting pin connected to said truck, a hanger lever pivotally connected to said pin, a balance hanger pivotally connected to said hanger lever on an axis fixed relative to the balance hanger, a brake head provided with spaced walls, each having a lug extending outwardly therefrom, a bolt and nut assembly for pivotally securing said head to said hanger lever and balance hanger, said hanger lever being disposed between said walls, one of said walls being disposed between said hanger lever and balance hanger, and a compressed helical spring interposed between said one wall and balance hanger and sleeved around said lug, said bolt and nut assembly having annular friction surfaces in abutment with the other wall and said balance hanger.

9. A brake head balancing device for a railway car truck comprising a supporting pin connected to said truck, a hanger lever pivotally connected to said pin, a balance hanger pivotally connected to said hanger lever on an axis fixed relative to the balance hanger, a brake head provided with spaced walls, fastening means for pivotally securing said head to said hanger lever and balance hanger, said hanger lever being disposed between said walls, one of said walls being disposed between said hanger lever and balance hanger, a compressed resilient member interposed between said one wall and balance hanger, and friction means secured to said fastening means in frictional engagement with the other wall.

10. A brake head balancing device for a railway car truck comprising a supporting pin connected to said truck, a hanger lever pivotally connected to said pin on an axis fixed relative to the balance hanger, a balance hanger pin-connected to said hanger lever, a brake head, fastening means for pivotally securing said head to said hanger lever, and compressed resilient means interposed between said balance hanger and head for frictionally resisting pivotal movement of said head about its axis.

No references cited.